US009691595B2

(12) United States Patent
Campbell et al.

(10) Patent No.: US 9,691,595 B2
(45) Date of Patent: Jun. 27, 2017

(54) MODULATION OF INSTRUMENT RESOLUTION DEPENDANT UPON THE COMPLEXITY OF A PREVIOUS SCAN

(71) Applicant: DH Technologies Development Pte. Ltd., Singapore (SG)

(72) Inventors: John Lawrence Campbell, Milton (CA); Stephen A. Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 14/964,417

(22) Filed: Dec. 9, 2015

(65) Prior Publication Data

US 2016/0093482 A1 Mar. 31, 2016

Related U.S. Application Data

(63) Continuation of application No. 14/401,034, filed as application No. PCT/IB2013/000735 on Apr. 19, 2013, now Pat. No. 9,236,231.

(Continued)

(51) Int. Cl.
*H01J 49/42* (2006.01)
*G01N 27/62* (2006.01)
*H01J 49/00* (2006.01)

(52) U.S. Cl.
CPC ........ *H01J 49/0081* (2013.01); *H01J 49/004* (2013.01); *H01J 49/0027* (2013.01); *H01J 49/0031* (2013.01)

(58) Field of Classification Search
CPC ...... H01J 49/004; H01J 49/0031; H01J 49/40; H01J 49/26; H01J 49/4265; H01J 49/427;

(Continued)

(56) References Cited

U.S. PATENT DOCUMENTS 4,507,555 A * 3/1985 Chang .................... G01N 30/72 250/281
5,073,713 A * 12/1991 Smith .................. H01J 49/004 250/282

(Continued)

FOREIGN PATENT DOCUMENTS

JP 2001-297730 A 10/2001
WO 2010-126655 A1 11/2010

OTHER PUBLICATIONS

International Search Report and Written Opinion for PCT/IB2013/000735, mailed Aug. 27, 2013.

*Primary Examiner* — David A Vanore

(74) *Attorney, Agent, or Firm* — John R. Kasha; Kelly L. Kasha; Kasha Law LLC

(57) ABSTRACT

Systems and methods are used to analyze a sample using variable detection scan resolutions. A tandem mass spectrometer is instructed to perform at least two scans of a sample with different detection scan resolutions using a processor. The tandem mass spectrometer includes a mass analyzer that allows variable detection scan resolutions. The selection of the different detection scan resolutions can be based on one or more properties of sample compounds. The properties may include a sample compound molecular weight distribution that is calculated from a molecular weight distribution of expected compounds or is determined from a list of molecular weights for one or more known compounds. The tandem mass spectrometer can also be instructed to perform an analysis of the sample before instructing the tandem mass spectrometer to perform the at least two scans of the sample.

20 Claims, 4 Drawing Sheets

Related U.S. Application Data

(60) Provisional application No. 61/649,201, filed on May 18, 2012.

(58) Field of Classification Search

CPC .... H01J 49/0027; H01J 49/081; H01J 49/061; H01J 49/0045; H01J 49/06; H01J 49/063; H01J 49/24; H01J 49/0004; H01J 49/009; H01J 49/0095; H01J 49/02; H01J 49/025; H01J 49/0431; H01J 49/10; H01J 49/4225; H01J 49/424; H01J 49/429; H01J 49/0036; H01J 49/005; H01J 49/0063; H01J 49/04; H01J 49/0445; H01J 49/0463; H01J 49/062; H01J 49/065; H01J 49/107; H01J 49/165; H01J 49/168; H01J 49/288; H01J 49/32; H01J 49/403; H01J 49/42; H01J 49/421; H01J 49/423; H01J 49/4255; G01N 27/622; G01N 27/624; G01N 30/24; G01N 30/463; G01N 30/467; G01N 30/72; G01N 30/7206; G01N 30/7233; G01N 30/724; G01N 30/8651; G01N 30/8655; G01N 30/8658; G01N 33/82

USPC ....... 250/282, 281, 288, 287, 283, 292, 290, 250/286, 289, 291, 423 R, 424, 29, 4, 250/305, 396 R

See application file for complete search history.

(56) References Cited

U.S. PATENT DOCUMENTS

| | | | | | |
|---|---|---|---|---|---|
| 5,248,875 | A * | 9/1993 | Douglas | H01J 49/063 | 250/281 |
| 5,696,376 | A * | 12/1997 | Doroshenko | H01J 49/427 | 250/282 |
| 5,821,534 | A * | 10/1998 | Park | H01J 49/004 | 250/287 |
| 6,147,348 | A * | 11/2000 | Quarmby | H01J 49/0063 | 250/282 |
| 6,191,417 | B1 * | 2/2001 | Douglas | H01J 49/004 | 250/281 |
| 6,441,369 | B1 * | 8/2002 | Vestal | H01J 49/40 | 250/281 |
| 6,489,610 | B1 * | 12/2002 | Barofsky | H01J 49/004 | 250/282 |
| 6,525,312 | B1 * | 2/2003 | Cousins | H01J 49/004 | 250/281 |
| 6,534,764 | B1 * | 3/2003 | Verentchikov | H01J 49/40 | 250/282 |
| 6,545,268 | B1 * | 4/2003 | Verentchikov | H01J 49/004 | 250/281 |
| 6,770,871 | B1 * | 8/2004 | Wang | H01J 49/004 | 250/281 |
| 7,157,698 | B2 * | 1/2007 | Makarov | H01J 49/004 | 250/281 |
| 7,429,729 | B2 * | 9/2008 | Schultz | G01N 27/622 | 250/286 |
| 8,030,612 | B2 * | 10/2011 | Collings | H01J 49/427 | 250/288 |
| 8,384,024 | B2 * | 2/2013 | Miller | G01N 27/624 | 250/281 |
| 8,461,521 | B2 * | 6/2013 | Vestal | H01J 49/403 | 250/287 |
| 8,481,921 | B2 * | 7/2013 | Green | H01J 49/004 | 250/281 |
| 8,525,111 | B1 * | 9/2013 | Brown | H01J 49/24 | 250/281 |
| 8,766,170 | B2 * | 7/2014 | Guna | H01J 49/0031 | 250/281 |
| 8,766,171 | B2 | 7/2014 | Guna et al. | | |
| 8,816,272 | B1 * | 8/2014 | Brown | H01J 49/24 | 250/282 |
| 8,822,916 | B2 * | 9/2014 | Guna | H01J 49/26 | 250/281 |
| 8,835,836 | B2 * | 9/2014 | Green | H01J 49/4265 | 250/281 |
| 8,847,157 | B2 * | 9/2014 | Whitehouse | H01J 49/063 | 250/287 |
| 8,921,774 | B1 * | 12/2014 | Brown | H01J 49/26 | 250/282 |
| 2005/0116162 | A1 | 6/2005 | Vestal | | |
| 2006/0043281 | A1 * | 3/2006 | Yoshinari | H01J 49/04 | 250/282 |
| 2006/0054804 | A1 * | 3/2006 | Wexler | G01N 27/622 | 250/282 |
| 2008/0230692 | A1 | 9/2008 | Reilly et al. | | |
| 2008/0296488 | A1 * | 12/2008 | Holle | H01J 49/0004 | 250/283 |
| 2009/0166522 | A1 * | 7/2009 | Umemura | H01J 49/0031 | 250/281 |
| 2009/0175766 | A1 | 7/2009 | Decorral | | |
| 2010/0237236 | A1 * | 9/2010 | Thomson | H01J 49/0045 | 250/283 |
| 2012/0091334 | A1 * | 4/2012 | Guna | H01J 49/26 | 250/283 |
| 2012/0168618 | A1 * | 7/2012 | Vestal | H01J 49/40 | 250/282 |
| 2013/0092834 | A1 * | 4/2013 | Covey | G01N 27/624 | 250/288 |
| 2014/0095084 | A1 * | 4/2014 | Tate | H01J 49/0031 | 702/27 |
| 2014/0291505 | A1 * | 10/2014 | Auger | G01N 33/82 | 250/282 |
| 2014/0361159 | A1 * | 12/2014 | Pfaff | H01J 49/0036 | 250/282 |
| 2014/0374592 | A1 * | 12/2014 | Baba | H01J 49/4255 | 250/283 |
| 2015/0008317 | A1 * | 1/2015 | Guna | H01J 49/0031 | 250/283 |
| 2015/0034812 | A1 * | 2/2015 | Yamaguchi | G01N 30/463 | 250/281 |
| 2015/0076342 | A1 * | 3/2015 | Campbell | H01J 49/165 | 250/288 |
| 2015/0097113 | A1 * | 4/2015 | Campbell | H01J 49/0031 | 250/282 |

* cited by examiner

MODULATION OF INSTRUMENT RESOLUTION DEPENDANT UPON THE COMPLEXITY OF A PREVIOUS SCAN

CROSS REFERENCE TO RELATED APPLICATION

This application is continuation of U.S. patent application Ser. No. 14/401,034 filed Nov. 13, 2014, filed as Application No. PCT/IB2013/000735 on Apr. 19, 2013, which claims the benefit of U.S. Provisional Patent Application Ser. No. 61/649,201, filed May 18, 2012, the content of which is incorporated by reference herein in its entirety.

INTRODUCTION

Both qualitative and quantitative information can be obtained from a tandem mass spectrometer. In such an instrument a precursor ion is selected in a first mass analyzer, fragmented and the fragments analyzed in a second analyzer or in a second scan of the first analyzer. The fragment ion spectrum can be used to identify the molecule and the intensity of one or more fragments can be used to quantitate the amount of the compound present in a sample.

Selected reaction monitoring (SRM) is a well-known example of this where a precursor ion is selected, fragmented, and passed to a second analyzer which is set to transmit a single ion. A response is generated when a precursor of the selected mass fragments to give an ion of the selected fragment mass, and this output signal can be used for quantitation. The instrument may be set to measure several fragment ions for confirmation purposes or several precursor-fragment combinations to quantitate different compounds.

The sensitivity and specificity of the analysis are affected by the width of the mass window selected in the first mass analysis step. Wide windows transmit more ions giving increased sensitivity, but may also allow ions of different mass to pass; if the latter give fragments at the same mass as the target compound interference can occur and the accuracy can be compromised.

The sensitivity and specificity of the analysis are also affected by the resolution of mass spectrometry instrument used. For example, the resolution of a mass spectrometry/mass spectrometry (MSMS) scan can define the selectivity of a fragment ion extraction. However, the resolution of the MSMS scan only has to be good enough to allow the distinction between potentially interfering compounds.

BRIEF DESCRIPTION OF THE DRAWINGS

The skilled artisan will understand that the drawings, described below, are for illustration purposes only. The drawings are not intended to limit the scope of the present teachings in any way.

Figure 1:
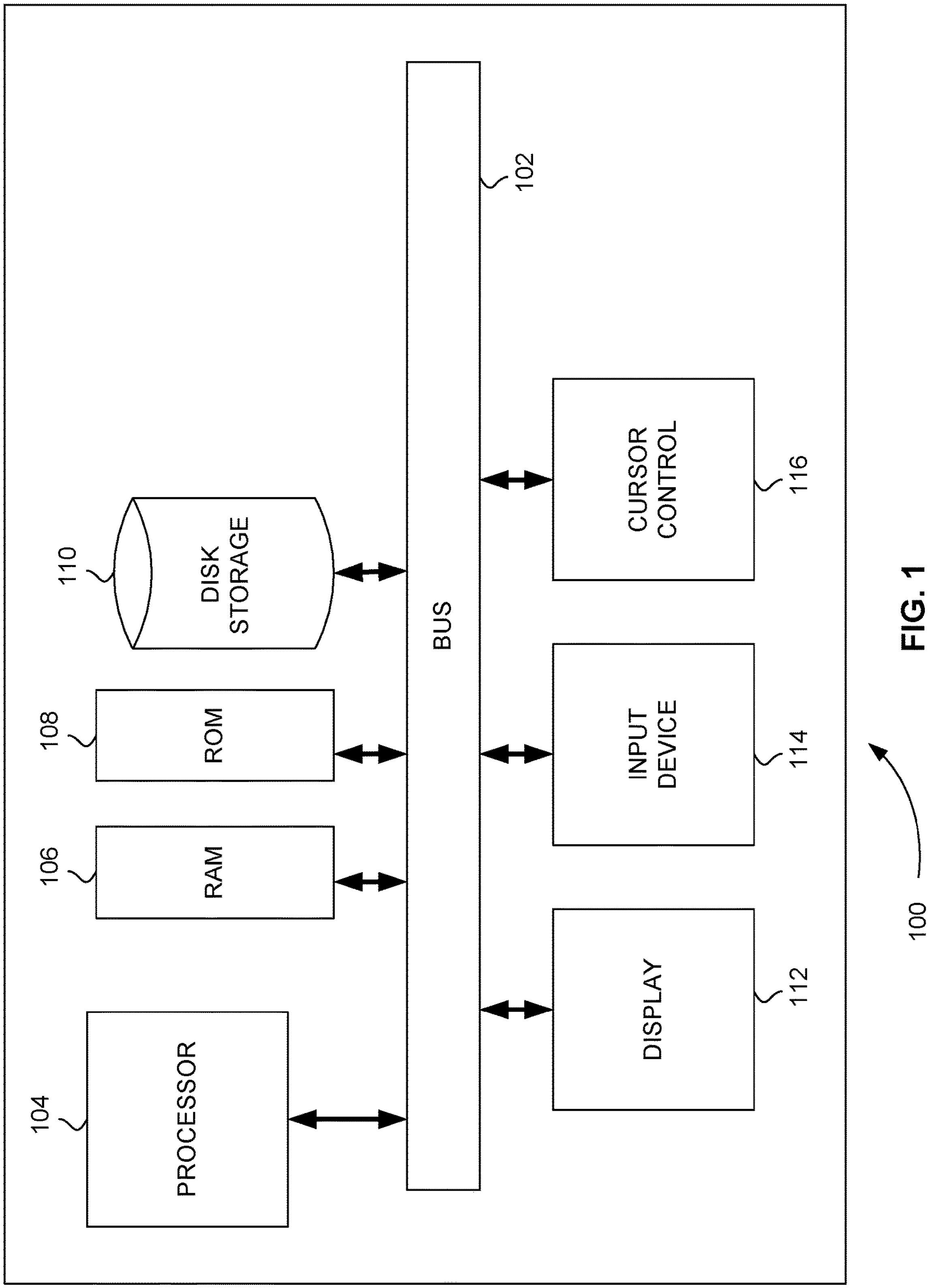
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods of Data Processing

As described above, the selectivity of mass spectrometry analysis can be improved by altering the width of the isolation window used. In various embodiments, the selectivity can also be improved by altering the resolution of the detection scans in the mass spectrometry instrument. Altering the resolution of the detection scans can be performed independently or can be combined with an alteration of the width of the isolation windows used to improve selectivity.

In various embodiments, dynamically modifying the resolution of a mass spectrometer allows a user to define a method based upon the type of selectivity they would like to use. For example, a user defines a selectivity factor, which they would like to see, and the instrument provides data which is of sufficient quality to meet the selectivity by modulating the resolution of the MSMS scan. By either performing a pre scan or by the use of a “survey” scan or from existing knowledge the instrument can define the resolution required to best provide a constant selectivity factor for the analysis. The selectivity factor can be defined as a parameter at run time or within the method.

In general, compounds of interest are not uniformly distributed across a mass range. In other words, various regions of the mass range are more likely to have compounds of interest rather than other regions. As a result, varying the resolution of a mass spectrometer in different regions across a mass range can maintain the sensitivity and specificity of the analysis, while increasing the throughput.

In various embodiments, a selectivity factor or parameter and a mass range are selected by a user. The selectivity factor can be defined as a parameter at run time or within the method. The mass range can include, for example, a preferred mass range of the sample or the entire mass range of the sample. The instrument divides the mass range into a collection of precursor ion (a.k.a target) windows. All ions in each window are selected, fragmented and analyzed in a detection scan. In each detection scan, the mass spectrometer performs a low resolution pre scan. Based on the results of the pre scan and the selectivity factor, the mass spectrometer sets the resolution for the detection scan resolution, and performs another detection scan of the detection scan resolution with that resolution. As a result, the instrument typically performs different scans of different resolutions across the mass range while maintaining a constant selectivity factor for the analysis.

Any type of tandem mass spectrometer can allow the selection of variable resolution detection scans across a mass range. A tandem mass spectrometer can include one or more physical mass analyzers that perform two or more mass analyses. A mass analyzer of a tandem mass spectrometer can include, but is not limited to, a time-of-flight (TOF), quadrupole, an ion trap, a linear ion trap, an orbitrap, or a Fourier transform mass spectrometer.

Variable Detection Scan Resolutions

In various embodiments, systems and methods allow the selection of variable resolution detection scans across a mass range at any time. Further, the value of the resolution chosen for a portion of the mass range can be based on information known about the sample.

Varying the value of the resolution of the detection scans across a mass range of an analysis can improve both the specificity, sensitivity, and speed of the analysis. For example, in areas of the mass range where compounds are known to exist, a high resolution is used. This enhances the specificity of the known compounds. In areas of the mass range where no compounds are known to exist or there are few compounds of interest, a low resolution is used. This allows unknown compounds to be found, thereby improving the sensitivity of the analysis. The combination of low and high resolution detection scans allows a scan of the mass range to be completed faster than using a fixed high resolution for all regions.

Also, by using high resolution scans in certain areas of the mass range, adjacent mass peaks are less likely to affect the analysis of the mass peaks of interest. Some of the effects that can be caused by adjacent mass peaks can include, but are not limited to, saturation, ion suppression, or space charge effects.

As mentioned above, in various embodiments the value of the resolution of the detection scan chosen for a portion of the mass range is based on information known about the sample. In other words, the value of the resolution of the detection scan is adjusted across the mass range based on the known complexity of the sample. So, where the sample is more complex or has a large number of ions, higher resolution scans are used, and where the sample is less complex or has a sparse number of ions, lower resolution scans are used. The detection scan resolutions may also be selected to meet certain criteria. For example, each detection scan resolution may be selected to meet the selectivity factor.

Resolution Based on A Molecular Weight Distribution

In various embodiments, a sample compound molecular weight distribution can be created from a molecular weight distribution of known compounds in the sample. The molecular weight distribution of known compounds in the sample is then used to select the detection scan resolutions across the mass range.

For example, a curve or distribution can be generated for known compounds of a sample. The known compounds can include, but are not limited to, a genome, a proteome, a metabolome, or a compound class, such as lipids. A histogram is calculated for the distribution. The histogram frequency is the number of compounds per interval of mass, for example. The histogram frequency is then converted to detection scan resolutions using a conversion function. A conversion function is the histogram frequency, for example.

In various embodiments, the sample compound molecular weight distribution can be calculated by adjusting a known molecular weight distribution. For example, a known protein molecular weight distribution can be adjusted to allow for modified forms of known proteins.

Resolution Based on a List of Molecular Weights

In various embodiments, a sample compound molecular weight distribution can be created from a list of molecular weights for target compounds. The sample compound molecular weight distribution is then used to select the detection resolutions across the mass range.

Resolution Based on a Sample Analysis

In various embodiments, a sample compound molecular weight distribution can be created by performing an analysis of the sample before the subsequent analysis that uses the variable detection scan resolutions. This analysis of the sample can include a complete analysis or a single scan. A complete analysis includes, for example, a liquid chromatography-mass spectrometry (LC-MS) analysis using a plurality of scans. A scan can be, but is not limited to, a survey scan, a neutral loss scan, a product ion scan, or a precursor ion scan.

The analysis of the sample can be used to determine the sample compound molecular weight distribution either directly or indirectly from an interpretation of the data. The sample compound molecular weight distribution is determined directly by obtaining one or more spectra from the analysis and calculating the sample compound molecular weight distribution from the one or more spectra.

The sample compound molecular weight distribution is determined indirectly by interpreting the data from the analysis and selecting a pre-calculated compound molecular weight distribution based on that interpretation. For example, an analysis of the sample can include a precursor scan. Interpreting the precursor scan can identify target product ions. A pre-calculated compound molecular weight distribution is then selected from a database for the identified target product ions.

Whether a sample compound molecular weight distribution is determined directly or indirectly from an analysis, it is used to define the resolution for the detection of ions from the different detection scan used in one or more subsequent analyses.

Resolutions Calculated in Real-Time

In various embodiments, an analysis to determine the sample compound molecular weight distribution and a subsequent analysis using detection scan resolutions based on the sample compound molecular weight distribution are performed two or more times in a looped manner as a sample is changing. If a sample is changing rapidly or in real-time, there may not be enough time to calculate the compound molecular weight distribution indirectly by interpreting the data from the analysis.

Therefore, in various embodiments a scan of the sample to determine the sample compound molecular weight distribution directly and a subsequent analysis using detection scan resolutions based on the sample compound molecular weight distribution are performed two or more times in a looped manner in real-time as a sample is changing. The sample compound molecular weight distribution is determined directly by obtaining a spectrum from the scan and calculating a sample compound molecular weight distribution from the spectrum. The subsequent analysis includes at least two scans using two different detection scan resolutions determined from the sample compound molecular weight distribution.

Other Parameters Based on a Sample Analysis

Other parameters of a tandem mass spectrometer are dependent on the detection scan resolutions that are determined from an analysis of the sample. These other parameters can include ion optical elements, such as collision energy, or non-ion optical elements, such as accumulation time.

As a result, in various embodiments the analysis of the sample can further include varying one or more parameters of the tandem mass spectrometer other than the detection scan resolution based on the sample compound molecular weight distribution that is determined.

Tandem Mass Spectrometry System

Figure 2:
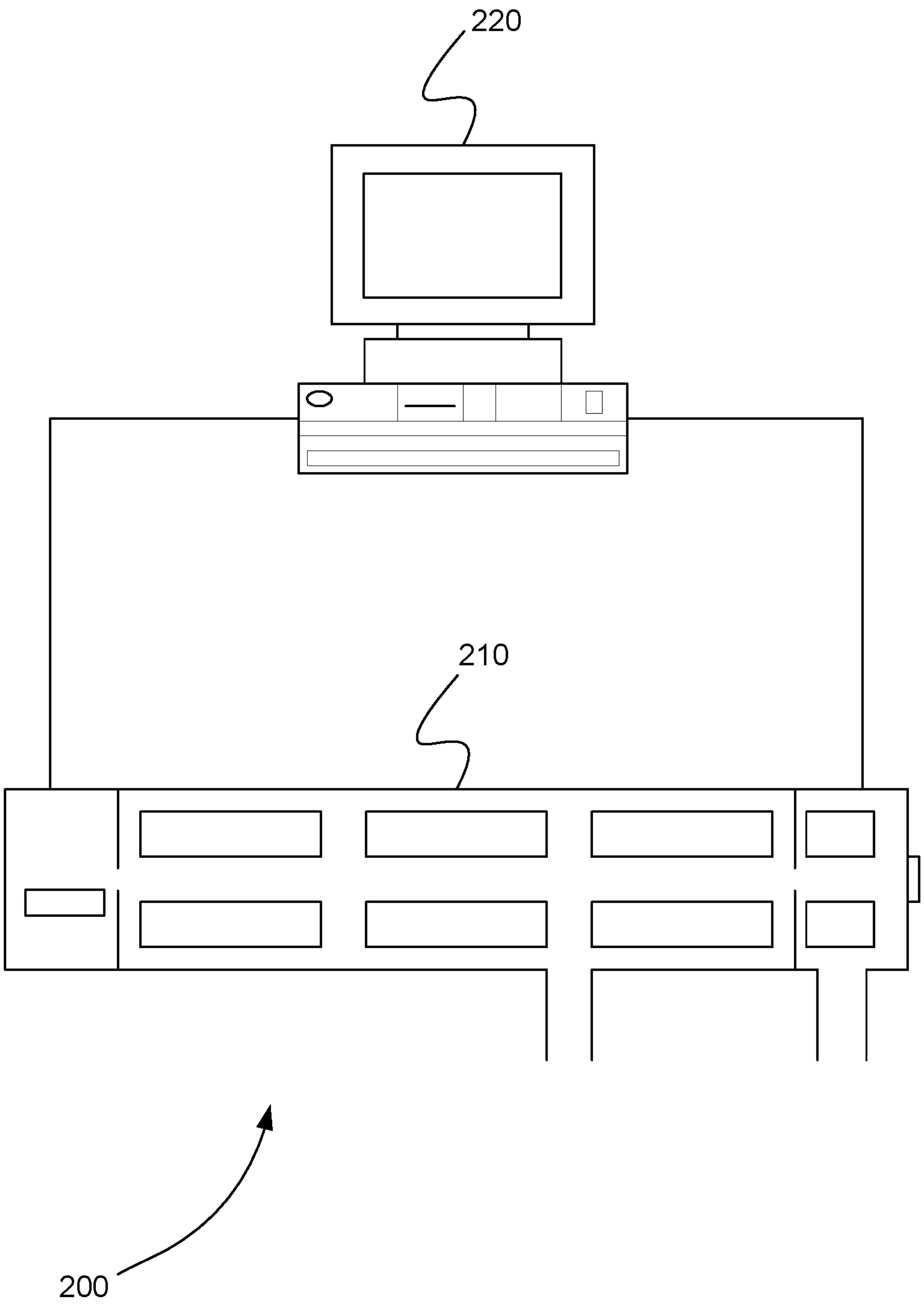
FIG. 2 is a schematic diagram showing a system for analyzing a sample using variable detection scan resolutions, in accordance with various embodiments.

FIG. 2 is a schematic diagram showing a system 200 for analyzing a sample using variable detection scan resolutions, in accordance with various embodiments. System 200 includes tandem mass spectrometer 210 and processor 220. Processor 220 can be, but is not limited to, a computer, microprocessor, or any device capable of sending and receiving control signals and data from mass spectrometer 210 and processing data.

Tandem mass spectrometer 210 can include one or more physical mass analyzers that perform two or more mass analyses. A mass analyzer of a tandem mass spectrometer can include, but is not limited to, a time-of-flight (TOF), quadrupole, an ion trap, a linear ion trap, an orbitrap, or a Fourier transform mass analyzer. Tandem mass spectrometer 210 can also include a separation device (not shown). The separation device can perform a separation technique that includes, but is not limited to, liquid chromatography, gas chromatography, capillary electrophoresis, or ion mobility. Tandem mass spectrometer 210 can include separating mass spectrometry stages or steps in space or time, respectively.

Tandem mass spectrometer 210 includes a mass analyzer that can perform scans with variable resolutions. Processor 220 instructs tandem mass spectrometer 210 to perform at least two scans of a sample with different detection scan resolutions.

In various embodiments, the detection scan resolutions are selected to maintain a same selectivity factor.

In various embodiments, the detection scan resolutions are based on one or more properties of sample compounds. The one or more properties of sample compounds can include a sample compound molecular weight distribution, for example. Processor 220 can calculate the sample compound molecular weight distribution using an isoelectric point (pI) or a hydrophobicity of an expected compound in the sample, for example.

In various embodiments, processor 220 calculates the sample compound molecular weight distribution from a molecular weight distribution of expected compounds in the sample.

In various embodiments, processor 220 determines the sample compound molecular weight distribution from a list of molecular weights for one or more known compounds.

In various embodiments, processor 220 instructs tandem mass spectrometer 210 to perform an analysis of the sample before the processor instructs tandem mass spectrometer 210 to perform the at least two scans of the sample that are part of a subsequent analysis of the sample. The analysis of the sample can include a single scan or two or more scans.

In various embodiments, processor 220 receives data produced by the analysis from tandem mass spectrometer 210 and calculates the sample compound molecular weight distribution from this data. For example, the processor 220 calculates the sample compound molecular weight distribution by obtaining a spectrum from the data and calculating the sample compound molecular weight distribution from the spectrum.

In various embodiments, processor 220 receives data produced by the analysis from tandem mass spectrometer 210, interprets the data, and determines the sample compound molecular weight distribution from a pre-calculated sample compound molecular weight distribution found from the interpretation of the data.

In various embodiments, processor 220 instructs tandem mass spectrometer 210 to perform the analysis and the subsequent analysis two or more times in a looped manner in real-time.

In various embodiments, processor 220 receives data produced by the analysis from tandem mass spectrometer 210, determines the sample compound molecular weight distribution from the data, and instructs the tandem mass spectrometer to also vary one or more parameters of the subsequent analysis other than the detection scan resolution based on the sample compound molecular weight distribution.

Tandem Mass Spectrometry Method

Figure 3:
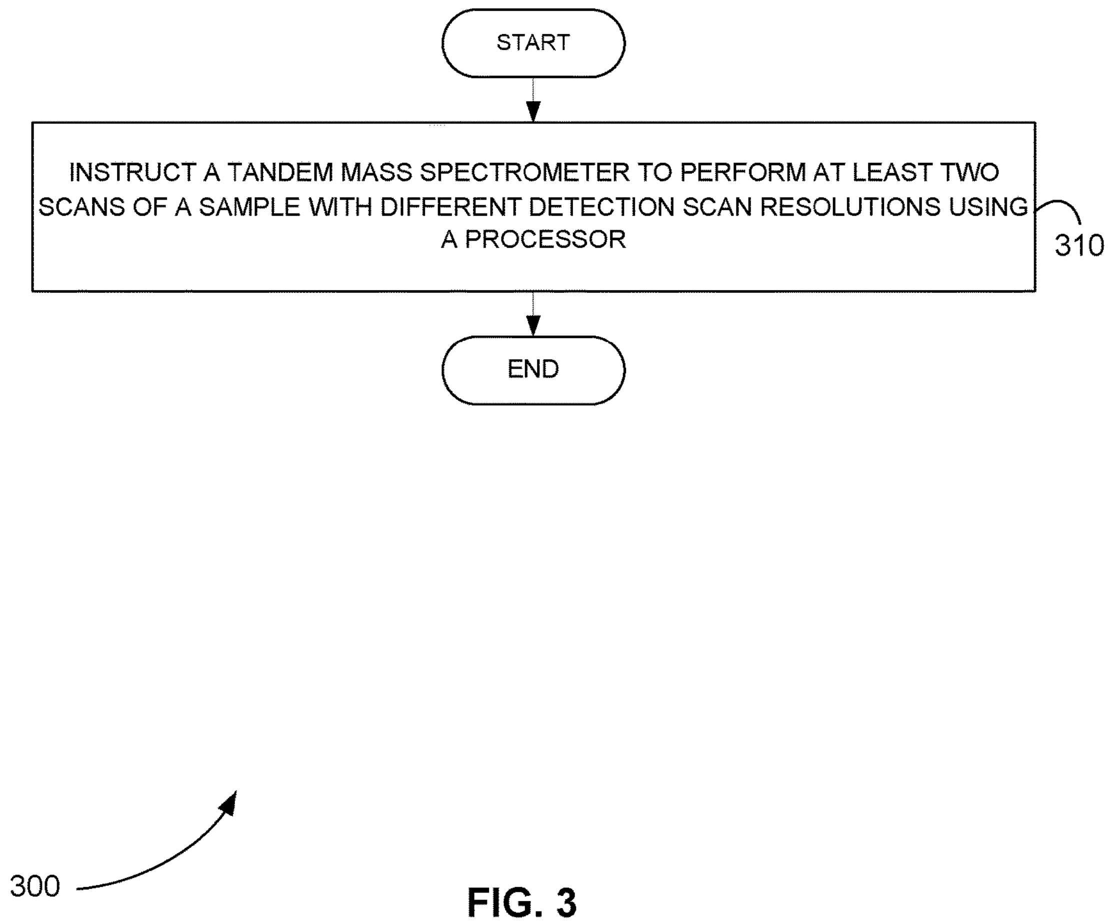
FIG. 3 is an exemplary flowchart showing a method for analyzing a sample using variable detection scan resolutions, in accordance with various embodiments.

FIG. 3 is an exemplary flowchart showing a method 300 for analyzing a sample using variable detection scan resolutions, in accordance with various embodiments.

In step 310 of method 300, a tandem mass spectrometer is instructed to perform at least two scans of a sample with different detection scan resolutions using a processor. The tandem mass spectrometer includes a mass analyzer that can perform detection scans at variable detection scan resolutions.

Tandem Mass Spectrometry Computer Program Product

In various embodiments, a computer program product includes a tangible computer-readable storage medium whose contents include a program with instructions being executed on a processor so as to perform a method for analyzing a sample using variable detection scan resolutions. This method is performed by a system that includes one or more distinct software modules.

Figure 4:
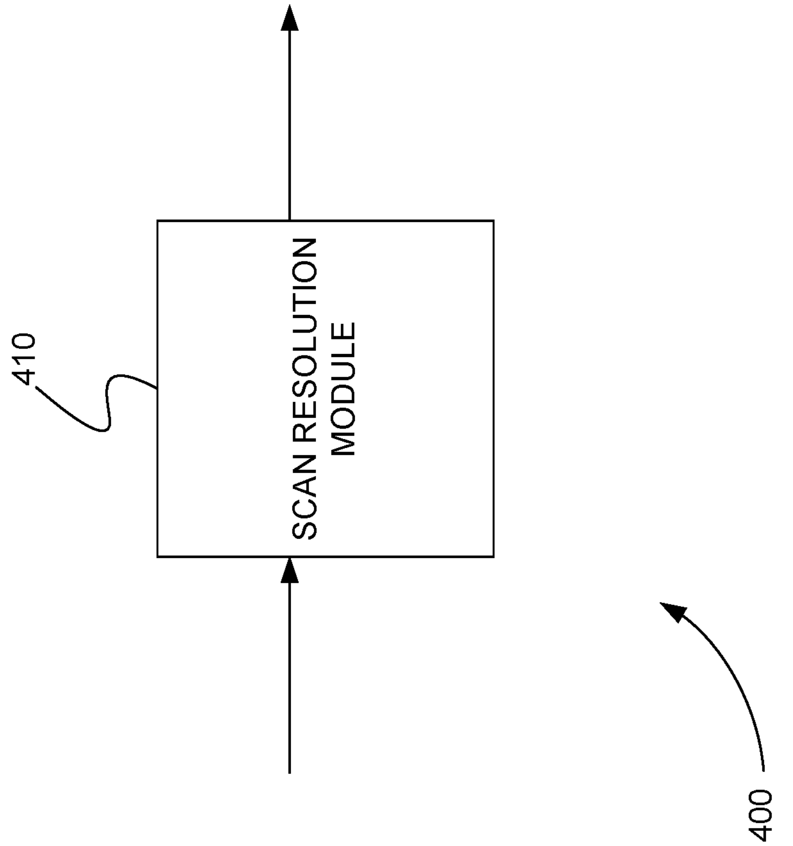
FIG. 4 is a schematic diagram of a system that includes one or more distinct software modules that performs a method for analyzing a sample using variable detection scan resolutions, in accordance with various embodiments.

FIG. 4 is a schematic diagram of a system 400 that includes one or more distinct software modules that performs a method for analyzing a sample using variable detection scan resolutions, in accordance with various embodiments. System 400 includes scan resolution module 410.

Scan resolution module 410 instructs a tandem mass spectrometer to perform at least two scans of a sample with different detection scan resolutions. The tandem mass spectrometer includes a mass analyzer that can perform detection scans at variable detection scan resolutions.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for analyzing a sample using variable detection scan resolutions, comprising:

a tandem mass spectrometer that includes a mass analyzer that allows variable detection scan resolutions; and a processor in communication with the tandem mass spectrometer that instructs the tandem mass spectrometer to divide a mass range of a sample into a collection of precursor ion windows, define different detection scan resolutions using information about the distribution of precursor ions across the mass range, and perform different detection scans of at least two different detection scan resolutions across the mass range to analyze fragment ions of at least two different precursor ion windows of the collection of precursor ion windows, which maintains the selectivity of fragment ion analysis while increasing the speed of the fragment ion analysis across the mass range.

2. The system of claim 1, wherein the at least two different detection scan resolutions include a higher resolution and a lower resolution, the at least two different precursor ion windows include a precursor ion window with a large number of precursor ions and a precursor ion window with a sparse number of precursor ions, and, using information about the distribution of precursor ions across the mass range, the processor instructs the tandem mass spectrometer to use the higher resolution to analyze fragment ions of the precursor ion window with a large number of precursor ions and to use the lower resolution to analyze fragment ions of the precursor ion window with a sparse number of precursor ions in order to maintain the selectivity of fragment ion analysis while increasing the speed of the fragment ion analysis across the mass range.

3. The system of claim 1, wherein the processor further instructs the tandem mass spectrometer to use at least two different accumulation times to analyze fragment ions of the at least two different precursor ion windows of the collection of precursor ion windows using information about the distribution of precursor ions across the mass range.

4. The system of claim 1, wherein the processor further instructs the tandem mass spectrometer to use at least two different collision energies to fragment the at least two different precursor ion windows of the collection of precursor ion windows using information about the distribution of precursor ions across the mass range.

5. The system of claim 1, wherein the processor further instructs the tandem mass spectrometer to perform a precursor ion survey scan of the mass range before instructing the tandem mass spectrometer to select and fragment all precursor ions in each precursor ion window of the collection of precursor ions windows in order to obtain the information about the distribution of precursor ions across the mass range.

6. The system of claim 1, wherein the information about the distribution of precursor ions across the mass range comprises a sample compound molecular weight distribution.

7. The system of claim 6, wherein the processor calculates the sample compound molecular weight distribution from a molecular weight distribution of expected compounds in the sample.

8. The system of claim 6, wherein the processor determines the sample compound molecular weight distribution from a list of molecular weights for one or more known compounds.

9. The system of claim 1, wherein the processor further instructs the tandem mass spectrometer to perform a precursor ion pre scan of each precursor ion window of the collection of precursor ions windows before fragmenting each precursor ion window of the collection of precursor ions windows, wherein the results of the pre scan of each precursor ion window of the collection of precursor ions windows provide the information about the distribution of precursor ions across the mass range.

10. The system of claim 5, wherein the processor receives data from the precursor ion survey scan and calculates the sample compound molecular weight distribution from the data.

11. The system of claim 10, wherein the processor calculates the sample compound molecular weight distribution by obtaining a spectrum from the data and calculating the sample compound molecular weight distribution from the spectrum.

12. The system of claim 10, wherein the processor receives the data, interprets the data, and determines the sample compound molecular weight distribution from a pre-calculated compound molecular weight distribution found from the interpretation of the data.

13. The system of claim 5, wherein the processor instructs the tandem mass spectrometer to perform a precursor ion survey scan of the mass range, a selection and fragmentation all precursor ions in each precursor ion window of the collection of precursor ions windows, and an analysis of fragment ions of each precursor ion window of the collection of precursor ions windows two or more times in a looped manner in real-time.

14. A method for analyzing a sample using variable detection scan resolutions, comprising:

dividing a mass range of a sample into a collection of precursor ion windows, wherein the tandem mass spectrometer includes a mass analyzer that allows variable detection scan resolutions;

defining different detection scan resolutions using information about the distribution of precursor ions across the mass range; and performing different detection scans of at least two different detection scan resolutions across the mass range to analyze fragment ions of at least two different precursor ion windows of the collection of precursor ion windows, which maintains the selectivity of fragment ion analysis while increasing the speed of the fragment ion analysis across the mass range.

15. The method of claim 14, wherein the at least two different detection scan resolutions include a higher resolution and a lower resolution, the at least two different precursor ion windows include a precursor ion window with a large number of precursor ions and a precursor ion window with a sparse number of precursor ions, and, using information about the distribution of precursor ions across the mass range, the higher resolution is used to analyze fragment ions of the precursor ion window with a large number of precursor ions and the lower resolution is used to analyze fragment ions of the precursor ion window with a sparse number of precursor ions in order to maintain the selectivity of fragment ion analysis while increasing the speed of the fragment ion analysis across the mass range.

16. The method of claim 14, further comprising using at least two different accumulation times to analyze fragment ions of the at least two different precursor ion windows of the collection of precursor ion windows using information about the distribution of precursor ions across the mass range.

17. The method of claim 14, further comprising using at least two different collision energies to fragment the at least two different precursor ion windows of the collection of precursor ion windows using information about the distribution of precursor ions across the mass range.

18. The method of claim 14, further comprising performing a precursor ion survey scan of the mass range before selecting and fragmenting all precursor ions in each precursor ion window of the collection of precursor ions windows in order to obtain the information about the distribution of precursor ions across the mass range.

19. The method of claim 14, further comprising performing a precursor ion pre scan of each precursor ion window of the collection of precursor ions windows before fragmenting each precursor ion window of the collection of precursor ions windows, wherein the results of the pre scan of each precursor ion window of the collection of precursor ions windows provide the information about the distribution of precursor ions across the mass range.

20. A computer program product, comprising a tangible computer-readable storage medium whose contents include a program with instructions being executed on a processor so as to perform a method for analyzing a sample using variable detection scan resolutions, the method comprising:

providing a system, wherein the system comprises one or more distinct software modules, and wherein the distinct software modules comprise a scan resolution module;

instructing a tandem mass spectrometer to divide a mass range of a sample into a collection of precursor ion windows using the scan resolution module, wherein the tandem mass spectrometer includes a mass analyzer that allows variable detection scan resolutions; and instructing the tandem mass spectrometer to define different detection scan resolutions using the scan resolution module using information about the distribution of precursor ions across the mass range; and instructing the tandem mass spectrometer to perform different detection scans of at least two different detection scan resolutions across the mass range to analyze fragment ions of at least two different precursor ion windows of the collection of precursor ion windows using the scan resolution module, which maintains the selectivity of fragment ion analysis while increasing the speed of the fragment ion analysis across the mass range.

* * * * *